United States Patent Office 3,445,230
Patented May 20, 1969

3,445,230
PHOTOCOPYING SYSTEM BASED ON PHOTOSENSITIVE METAL CARBONYLS

Ronald Francis, Arlington, Mass., assignor to Itek Corporation, Lexington, Mass., a corporation of Delaware No Drawing. Filed Apr. 5, 1965, Ser. No. 445,797
Int. Cl. G03c *5/24*
U.S. Cl. 96—48 14 Claims

ABSTRACT OF THE DISCLOSURE

This disclosure relates to a photographic copy medium comprising a metal carbonyl compound, and to the process of imagewise exposing this copy medium to form a latent image. A permanent image may be formed by contacting this copy medium prior to, at the time of or subsequent to exposure with a chemically reactive image-forming material which reacts upon exposure or upon contact with exposed portions of the copy medium.

The present invention relates to data storage systems and methods, and relates in particular to systems and methods for image reproduction.

According to the present invention, it has been discovered that metal carbonyl compounds are radiation sensitive and by irradiation can be rendered reactive with reducible materials such as metal ions. The reaction in general for the metal carbonyl compounds, by which term is meant not only the simple binary carbonyls, but also carbonyl halides, the carbonyl-nitric oxide complexes, complexes with hydrogen, carbonylate salts, and organic carbonyl materials such as the alkyl and aryl metal carbonyls, pi-allyl complexes, and pi-arene complexes including the cyclopentadienyl complexes.

Many carbonyl compounds suitable for use according to the present invention are described in F. A. Cotton and G. Wilkinson, Advanced Inorganic Chemistry, Interscience Publishers, Inc., New York (1962), pp. 611–869. Table 27–1 of this work, which is incorporated herein by reference, discloses numerous binary carbonyls of the formula $M_x(CO)_y$ where M is a metal, and $x$ and $y$ are integers. Carbonyls of vanadium, chromium, tungsten, molybdenum, manganese, iron, cobalt, nickel, ruthenium, osmium, rhodium, and iridium are shown in the table as the more important carbonyls.

Table 27–3 of the same source teaches numerous carbonyl halides, isocyanide complexes, and substituted phosphine and arsine complexes such as $Mn(CO)_5Cl$, $$[Mn(CNCH_3)_6]I$$

$Ni(PCl_3)_4$, and $Mn(CO)_3Cl(AsC_6H_5)_2$.

Nitric oxide complexes include $Mn(NO)_3CO$, $$Co(CO)_3NO$$

and still others shown in Table 27–4 of the Cotton et al. reference. The tubulated carbonyls comprise only a few examples of the many complexes possible.

Exemplary hydrogen complexes (or hydroxides) are shown in Table 27–5 of Cotton et al. and include $$HMn(CO)_5$$

$H_2Fe_3(CO)_{11}$, and $HPtCl[P(C_2H_5)_3]_2$ for example.

Carbonylate salts are materials such as $Na[HFe(CO)_4]$, $Na[Co(CO)_4]$, and $$[K(dimethylglyoxime)_3{}^+[Mo(CO)_5I]^-$$

for example.

Exemplary alkyl and aryl metal carbonyl derivatives as well as allyl, arene, and other complexes, are shown and described in Organometallic Chemistry, Academic Press, New York (1964) edited by F. G. A. Stone and R. West. The papers "Alkali Metal Derivatives of Metal Carbonyls and Related Compounds" by R. B. King on pages 157–251, "Allyl Metal Complexes" by M. L. H. Green and P. L. I. Nagy on pages 325–363, "Synthesis of Cyclopentadienyl Metal Compounds" by J. M. Birmingham on pages 365–413, and "Some Advances in Organometallic Chemistry of Nickel" on pages 2–48 are of particular interest and are incorporated herein by reference.

Alkyl and aryl carbonyls include compound classes such as $RM(CO)_3C_5H_5$, $RM(CO)_5$, $RM(CO)_4PR'_3$, $$R_2Fe(CO)_4$$

$RM(CO)_2C_5H_5$, $RCo(CO)_4$, and $RCo(CO)_3PR'_3$ as shown more fully in the King article cited above.

The article of Green and Nagy discusses numerous $\pi$-allyl carbonyls.

Cyclopentadienyl carbonyls and other arenes are discussed and shown in the article by G. Wolkinson and F. A. Cotton, "Cyclopentadienyl and Arene Metal Compounds" in Progress in Inorganic Chemistry, volume 1, Interscience Publishers, Inc., New York (1959), pages 1–124, edited by F. A. Cotton. Particular attention is called to Tables II, VIII, IX, XII, XIII, and XIV of this article.

When metal carbonyl compounds of the type described are irradiated with activating radiation, they will reduce metal ions, particularly noble metal ions such as silver, with formation of free metal, such as metallic silver.

The reactions just described can be used in data storage systems, and particularly in systems for image reproduction. Thus, by selective irradiation of a copy medium comprising a metal carbonyl compound, for example by irradiation with an image pattern of radiation, and subsequent contact of the irradiated copy medium with a material such as silver nitrate, a latent metal image such as of metallic silver can be formed in the medium in those portions thereof which have been exposed to radiation.

The nature of the reaction occuring when carbonyls are irradiated with ultra-violet light is not fully known, though it is known that the substances decompose with the release of carbon monoxide. The reaction is reversible. That is, a copy medium according to the invention will regain its original sensitivity to light after exposure to ultraviolet light if permitted to stand after exposure, without development.

The radiation sensitive metal carbonyl compounds of the present invention can be applied to a suitable carrier by absorption or by application in a coating on the surface of the carrier. Thus, for example, the metal carbonyl compounds of the present invention can be imbibed in a fibrous web carrier such as of wood or paper to sensitize the carrier, or can be applied directly as a thin film on a carrier such as glass, metal, or the like. The carbonyls may also be applied as films to a carrier such as paper by incorporation in an inert binder material of a type conventionally used in the art for the preparation of photosensitive papers. For the formulation of copy media, those metal carbonyl compounds which are most inert to atmospheric moisture and oxygen are preferred, as are, also, those carbonyls which have low volatility at room temperature.

The metal carbonyl compounds of the present invention have the advantage of being capable of application to a carrier surface in the form of a thin transparent film for the preparation of pellucid (i.e., transparent or translucent) bodies suitable for viewing by the transmission of light therethrough.

The carbonyl-containing copy media of the invention are suitably exposed to ultra-violet light for activation, i.e., light comprising wavelengths of less than about 400 millimicrons. However, shorter wavelengths will also activate many of the metal carbonyl compounds disclosed herein. That many of these carbonyls absorb in the visible spectrum is evident from the fact that they are colored.

If long exposure times are employed, and if the copy media comprise large amounts of photosensitive carbonyl, visible images of precipitated free metal may be produced in the exposed medium on contact of the irradiated medium with a reducible metal ion. However, photographically faster and more flexible systems are possible when a latent metal image is formed which is then amplified or intensified.

For formation of a metal image, an irradiated carbonyl-containing copy medium is contacted according to the present invention with a solution of a metallic ion such as silver ion, mercuric ion, mercurous ion, or of some other noble metal ion whose reduction potential to free metal is of the same magnitude as that of silver or mercury, whereupon a precipitate of free metal is deposited on light-struck areas where the carbonyl has been activated. Unless unusually long exposure times are employed, the resultant metal image will be a latent, or invisible, metal image.

For intensification of this latent image, metal ions such as silver ion, mercurous ion, are used with chemical redox systems, preferably organic redox systems such as hydroquinone, metol (p-methyl-amino-phenol sulfate), phenidone, and the like. It will be recognized that these redox systems and combinations, particularly the combinations with silver ion, are those commonly employed as developers in silver halide photography. However, other redox systems and/or other metal ions having a reduction potential comparable to that of silver or mercury ion can also be employed in formulating image intensification.

A better understanding of the present invention and of its many advantages may be had by referring to the following specific examples given by way of illustration.

Example 1

An absorbent paper carrier was impregnated with a saturated solution of tungsten hexacarbonyl in chloroform. After drying, the impregnated paper was exposed in a Beseler box to ultraviolet light from a 4-watt black light fluorescent lamp for from 5 to 20 seconds at a distance of about ½ centimeter. The exposed copy medium was next contacted with a saturated methanolic solution of silver nitrate, whereupon an invisible latent image of metallic silver was formed in the medium. The latent image was subsequently amplified by contact of the medium with a methanolic solution of phenidone and citric acid. Additional free silver was deposited in those portions of the carrier where silver metal was present due to prior reaction of silver nitrate with irradiated carbonyl.

Those skilled in the photographic arts will appreciate that considerable variation in exposure time, distance of the medium from the radiation source, and in the intensity of the irradiating source are all possible. These factors are all interrelated in a manner well known to those skilled in the photographic arts and can be modified to produce different desired effects with the image reproduction system of the present invention.

Example 2

A thin, transparent layer of chromium carbonyl was applied to transparent glass and transparent film-base substrates from a solution of the carbonyl in chloroform. The resulting coated transparent materials were exposed to a pattern of imaging ultraviolet radiation as in Example 1, and then developed and amplified as in that example. The resulting reproduced images were photographic transparencies suitable for viewing by transmitted light.

Example 3

A slurry comprising 40 gms. of molybdenum carbonyl, a dispersion of a commercially available acrylate resin binder ("Rhoplex") containing 18.5 gms. of resin solids, 187 gms. of $H_2O$, and 0.8 gms. of a wetting agent was prepared and applied as a surface coating to paper. The dried coated paper was then exposed to an image pattern of ultraviolet radiation and developed with amplification as in Example 1 with the formation of a visible image.

Various other binder materials are known to those skilled in the art of making radiation sensitive papers and could be employed instead of the resin binder of Example 3. Polyvinyl acetate, for example, is a hydrophobic binder often used in the art, as are various silicone resin binders. Hydrophilic binder materials are prefered, since the binder is then more permeable to developing agents, which generally have an aqueous or alcholic constituent. Typical preferred hydrophilic binders are materials such as gelatin, polyvinyl alcohol, and ethyl cellulose, for example, though many other materials of both types are known in the art and could be mentioned.

If the radiation sensitive carbonyls of the present invention are applied to a carrier in solution, rather than in suspension, they can be applied in organic solvents such as chloroform, acetone, carbon tetrachloride, and other materials in which the radiation sensitive carbonyls are known to be soluble.

Example 4

Filter paper was impregnated with a saturated solution of molybdenum carbonyl in chloroform and then dried. The paper was then immersed in a saturated solution of $AgNO_3$ in methanol and again dried. On exposure to an image pattern of ultraviolet radiation, a yellow-brown visible image formed which was intensified by contact of the paper with a methanolic solution of phenidone and citric acid. Silver ion for amplification was supplied by the paper itself.

Example 5

Paper was impregnated with a solution of $[C_5H_5Fe(CO)_2]_2$ in chloroform, then dried and exposed to an image pattern of ultraviolet light. The paper was then dipped into methanolic $AgNO_3$, and then into phenidone and citric acid, with formation of a visible image.

Although specific embodiments have been shown and described, it will be understood that they are illustrative, and are not to be construed as limiting on the scope and spirit of the invention.

What is claimed is:

1. The method of producing a permanent image in a copy medium, which method comprises exposing a copy medium comprising a metal carbonyl compound to an image pattern of radiation to render radiation-struck portions of said carbonyl compound reactive with reducible metal ions, and then contacting at least the radiation-struck portions of said medium with a reducible metal ion to precipitate free metal on the irradiated portions of said copy medium.

2. The method as in claim 1 wherein said metal ion is silver ion.

3. The method as in claim 1 wherein said carbonyl compound is selected from the group consisting of chromium, tungsten, molybdenum, and cyclopentadienyliron carbonyls.

4. The method as in claim 1 wherein said carbonyl compound is chromium carbonyl.

5. The method as in claim 1 wherein said carbonyl compound is tungsten carbonyl.

6. The method as in claim 1 wherein said carbonyl is molybdenum carbonyl.

7. The method as in claim 1 wherein said carbonyl compound is cyclopentadienyliron carbonyl.

8. The method as in claim 1 wherein said copy medium comprises a carrier having said carbonyl compound absorbed therein.

9. The method as in claim 1 wherein said copy medium comprises a carrier having said carbonyl compound present in a coating thereon.

10. The method as in claim 1 wherein the image pattern reproduced in said medium by precipitated free metal is amplified by contacting said medium in the presence of reducible metal ion with a redox system reactive with said metal ion to precipitate further free metal where free metal is already present in said medium.

11. A radiation sensitive copy medium having a latent metal image thereon, said medium comprising a metal carbonyl compound and a carrier therefor, and a latent image pattern formed by a finely divided free metal precipitate on said carrier.

12. A copy medium as in claim 11 wherein said free metal is silver.

13. A radiation sensitive copy medium having a visible metal image thereon, said medium comprising a carbonyl selected from the group consisting of chromium, tungsten, molybdenum and cyclopentadienyliron carbonyls and a carrier therefor, and a visible image pattern formed by a finely divided free metal precipitate on said carrier.

14. A copy medium as in claim 13 wherein said metal is silver.

References Cited

UNITED STATES PATENTS

| | | | |
|---|---|---|---|
| 3,380,823 | 4/1968 | Gold | 96—48 |
| 3,382,068 | 5/1968 | Gold | 96—48 |
| 2,865,707 | 12/1958 | Hogsed | 96—88 |
| 2,738,272 | 3/1956 | Jonker et al. | |
| 3,152,903 | 10/1964 | Shepard et al. | |

OTHER REFERENCES

Dodson, G. R. "The Mechanism of Photochromism in Metal Carbonyl Solutions," J. Phys. Chem., 69: 677–8 February 1965, El-Sayed, M. A., "New Class of Photochromic Substances: Metal Carbonyls," J. Phys. Chem., 68: 433–4, 1964.

Massey, A. G. et al., "A reversible Photochromic Polymer," Nature, No 4796; September 1961, p. 1387.

NORMAN G. TORCHIN, *Primary Examiner.*

CAROLYN E. DAVIS, *Assistant Examiner.*

U.S. Cl. X.R.

96—88, 90